United States Patent [19]
Yuasa et al.

[11] Patent Number: 5,771,220
[45] Date of Patent: Jun. 23, 1998

[54] OUTPUT CONTROL APPARATUS OF SEMICONDUCTOR LASER DEVICE

[75] Inventors: Masami Yuasa; Yoshiki Takemoto, both of Chiba, Japan

[73] Assignee: Sony Corporation, Tokyo, Japan

[21] Appl. No.: 732,786

[22] Filed: Oct. 15, 1996

[30] Foreign Application Priority Data

Oct. 16, 1995 [JP] Japan .................................. 7-293724

[51] Int. Cl.⁶ .................................................. G11B 7/00
[52] U.S. Cl. .............................. 369/116; 369/54; 369/48; 369/13
[58] Field of Search ................................ 369/116, 59, 58, 369/54, 53, 42, 48, 49, 50, 13, 32

[56] References Cited

U.S. PATENT DOCUMENTS 5,495,464  2/1996  Fujikawa et al. .................. 369/116 X
5,614,708  3/1997  Koishi et al. ....................... 369/116 X
5,657,307  8/1997  Taneya et al. ........................ 369/116

*Primary Examiner*—Muhammad N. Edun
*Attorney, Agent, or Firm*—Frommer Lawrence & Haug LLP; William S. Frommer

[57] ABSTRACT

A recording and reproducing apparatus includes a semiconductor laser device for irradiating a light beam, a driving circuit for driving the semiconductor laser device, and an oscillation device for generating a predetermined high-frequency signal. The high-frequency signal generated by this oscillation device is superposed onto a driving signal of the driving circuit in order to drive the semiconductor laser device.

10 Claims, 4 Drawing Sheets

DIRECTION OF ROTATION OF DISC

DIRECTION OF MOVEMENT OF SPOT

DIRECTION OF MOVEMENT OF SPOT

OUTPUT CONTROL APPARATUS OF SEMICONDUCTOR LASER DEVICE

BACKGROUND OF THE INVENTION

1. Field of the Invention

The present invention relates to a control apparatus for controlling a laser device for emitting laser light when information is recorded on a recordable magnetic medium, such as a mini-disc (MD) or a magneto-optical (MO) disc by irradiating laser light thereto.

2. Description of the Related Art

In a magneto-optical disc unit of the known art in which information is recorded on a magneto-optical disc, such as on an MO disc by irradiating laser light by means of a semiconductor laser device such as a laser diode, the output of laser light is at a relatively high output during recording because magnetic recording is performed on a signal recording surface of the magneto-optical disc. During reproduction, the output of laser light is at a relatively low output because it is only necessary to detect the return laser light reflected from the signal recording surface of the magneto-optical disc.

However, there is the following disadvantage. When return laser light from the signal recording surface of a magneto-optical disc enters the laser light emission end-surface of a semiconductor laser device which is a laser light source, since the output of the laser light is relatively low during reproduction, the laser light emitted from such semiconductor laser device interferes with the return laser light and resonance occurs, causing the laser light to be modulated. For this reason, what is commonly called a high-frequency superposition module comprising a high-frequency oscillator is used to cancel the influence of the return laser light to the laser light emission end-surface of the semiconductor laser device by superposing a high-frequency signal from the high-frequency superposition module onto the driving current of the semiconductor laser device.

Comparatively, during recording, since magneto-optical recording by magnetic-field modulation is performed on the signal recording surface of the magneto-optical disc, the semiconductor laser device is made to emit continuous-wave light, and therefore the laser light output is relatively high. Therefore, since the laser light from the semiconductor laser device normally does not interfere with return laser light from the magneto-optical disc, causing resonance, high-frequency superposition is not performed. Also, as disclosed in, for example, U.S. Pat. No. 5,495,456, the performance of high-frequency superposition has been considered during recording as well, but a superposition signal of a frequency considerably lower than the frequency used during reproduction is used.

However, in the magneto-optical disc unit constructed as described above, laser output of the semiconductor laser device is varied from production lot to production lot. Therefore, since the laser output is relatively unstable during recording depending upon the quality of the semiconductor laser device, there is a case in which the laser light interferes with the return laser light from the magneto-optical disc, and resonance occurs. As a result, the laser output might be varied.

As a result, when recording of signals is performed by the magnetic-field modulation method, the spot L of a light beam from a semiconductor laser device with respect to a desired position on a signal recording surface of a magneto-optical disc forms a mark (a magnetic domain, i.e., a magnetically recorded portion by a magnetic head indicated by the oblique lines) with respect to a desired track T on the signal recording surface of a magneto-optical disc, as shown in FIG. 4. However, the edge of this mark is displaced due to the variation of the laser output.

That is, when laser output from the semiconductor laser device is normal, as shown in the upper portion of FIG. 5, laser output is nearly constant. Therefore, in such a case, track T of the signal recording surface of the magneto-optical disc is uniformly heated by the irradiation of laser light, and thermal magnetic recording is performed by the magnetic-field of the magnetic head, as shown in the lower portion of FIG. 5.

Comparatively, when laser output of the semiconductor laser device is relatively weak, since the laser output interferes with the return light from the magneto-optical disc and resonance occurs, the laser output has a high output portion due to resonance, as shown in the upper portion of FIG. 6. For this reason, there are problems, for example, since a portion which is heated to above a predetermined temperature becomes large with respect to track T of the signal recording surface of the magneto-optical disc in the portion where the output is high, the portion recorded by the magnetic head, i.e., the mark, is displaced along the length of the track T, and writing jitter occurs. When this displacement exceeds a threshold value, a writing error occurs.

Thus, in the manufacture of a magneto-optical disc unit, a semiconductor laser device having a normal laser output is selected and is used as a light source of a magneto-optical disc unit with a semiconductor laser device such that the laser output interferes with the return light from the magneto-optical disc and resonance occurs being excluded. Thus, the above-described writing error does not occur.

For this reason, problems arise, for example, the yield of semiconductor laser devices used in magneto-optical disc units is decreased, and the cost of semiconductor laser devices is increased.

SUMMARY OF THE INVENTION

In view of the above-described points, an object of the present invention is to provide an output control apparatus of a semiconductor laser device in a magneto-optical disc unit which is capable of performing normal recording during recording even if the performance of the semiconductor laser device used as a light source during recording on or reproduction from the magneto-optical disc is varied.

According to the present invention, the above-described object is achieved by an output control apparatus of a semiconductor laser device for recording and/or reproducing information signals on and from the signal recording surface of a magneto-optical disc, the apparatus comprising means for superposing a high-frequency signal onto a driving signal of a semiconductor laser device during recording, wherein recording of signals is accurately performed in a predetermined size on recording tracks of a magneto-optical disc.

With the above-described construction, since a high-frequency signal is superposed onto a driving signal of a semiconductor laser device during recording, the influence by the return light beam from the magneto-optical disc onto the end surface of the semiconductor laser device is cancelled. As a result, even in a case where the laser output from the semiconductor laser device during recording is relatively low, when the return light beam from the signal recording surface of the magneto-optical disc enters the end surface of the semiconductor laser device, laser light emitted from such semiconductor laser device does not interfere with the above-mentioned return light beam and resonance does not occur.

Therefore, since a constant laser output can be obtained, signals can be accurately recorded on predetermined tracks on the signal recording surface of the magneto-optical disc.

In a case in which the above-mentioned high-frequency signal is a signal which is the same as the high-frequency signal which is superposed onto the driving signal of the semiconductor laser device during reproduction, since the high-frequency superposing circuit for reproduction purposes is used as it is, on/off of the high-frequency superposing circuit is not required because the same high-frequency superposing circuit is used during recording and reproduction, and thus the construction is simplified.

In a case in which the above-mentioned high-frequency signal is a signal such that the output amplitude of a high-frequency signal which is superposed onto a driving signal of a semiconductor laser device during reproduction is decreased, a high-frequency superposing circuit for reproduction purposes is used, and the driving signal which is high-frequency superposed is controlled so as not to exceed a rated value as a result of a decrease in the above-mentioned output amplitude. Therefore, signal recording by laser output in predetermined tracks on the signal recording surface of a magneto-optical disc is performed accurately even more.

The above and further objects, aspects and novel features of the invention will become more apparent from the following detailed description when read in connection with the accompanying drawings.

DESCRIPTION OF THE PREFERRED EMBODIMENTS

The preferred embodiments of the present invention will now be described below in detail with reference to FIGS. 1 to 3.

Since the embodiments to be described below are the preferred specific examples of the present invention, various technically preferable limitations are imposed thereon. However, the scope of the present invention is not limited to these embodiments unless specifically described to limit the present invention in the following description.

Figure 1:
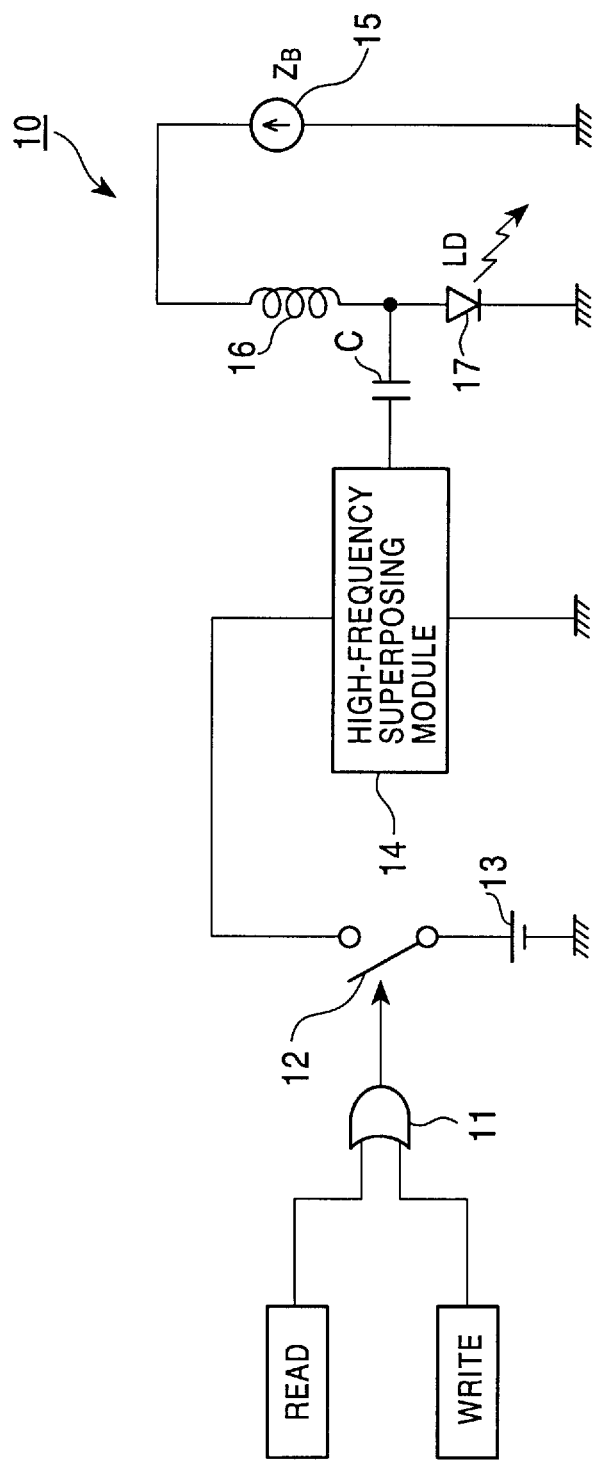
FIG. 1 is a block diagram illustrating a first embodiment of a laser output control apparatus according to the present invention.

FIG. 1 shows a first embodiment of a laser output control apparatus of a magneto-optical disc unit according to the present invention.

In FIG. 1, a laser output control apparatus 10 comprises an OR circuit 11, to whose respective input terminals a recording mode signal Write or a reproduction mode signal Read from a control circuit of a magneto-optical disc unit (not shown) is input; a switch 12 which is closed in accordance with an output signal from the OR circuit 11; a high-frequency superposition module 14 connected in series to the switch 12 and a power supply 13; and a semiconductor laser device 17 to which a high-frequency signal from the high-frequency superposition module 14 and a driving signal (driving current) from a choke coil 16 are applied.

The OR circuit 11 is designed to output a signal when either one of the recording mode signal signal Write during recording and the reproduction mode signal Read during reproduction from the control circuit of the magneto-optical disc unit is input.

The switch 12 is a switch for turning on and off a driving voltage to the high-frequency superposition module 14 from the power source 13 and is closed in accordance with a signal from the OR circuit 11.

The semiconductor laser device 17, in the case of the figure, is formed as a laser diode. When the driving current I from a driving circuit 15 is applied via the choke coil 16, the semiconductor laser device 17 operates to output laser light.

The driving circuit 15 drives and controls the semiconductor laser device 17 in accordance with a write recording mode signal Write and a reproduction mode signal Read from the control circuit of a magneto-optical disc unit (not shown) so that a relatively large laser output is produced during recording and a relatively small laser output is produced during reproduction.

The high-frequency superposition module 14 operates upon the application of a driving voltage from the power source 13 when the switch 12 is closed and outputs a high-frequency signal of a predetermined frequency, e.g., 100 MHz to 1 GHz, and preferably 600 MHz. As a result, since the influence of the return laser light on the end surface of the semiconductor laser device 17 is cancelled, resonance caused by interference between the laser light output from the semiconductor laser device 17 and the return laser light does not occur, and thus modulation of the laser light is eliminated.

In such a case, the end-surface thermal time constant of the semiconductor laser device 17 is on the order of micro seconds. In a case in which a high-frequency signal is superposed onto this semiconductor laser device 17, if a high-frequency signal of 100 MHz or higher is superposed, heat generation on the end surface of the semiconductor laser device 17 is not increased, and thus the service life of the device is not deteriorated. The inventors of the present invention have confirmed the above fact.

The laser output control apparatus 10 of this embodiment is constructed as described above. The operation thereof will be described with reference to FIG. 2.

Figure 2:
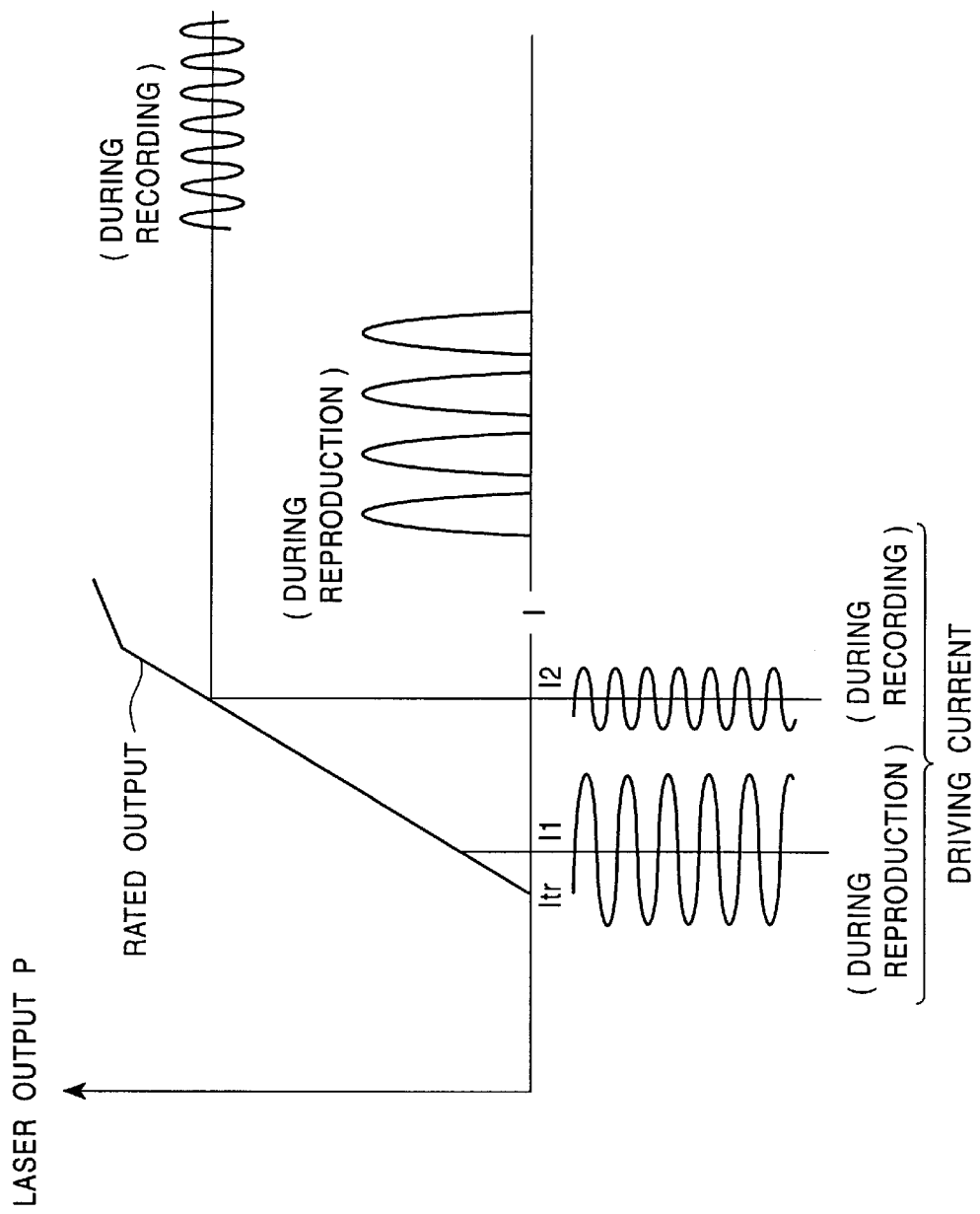
FIG. 2 is a graph illustrating the relationship between a driving current I and laser output P of a semiconductor laser device in the apparatus of FIG. 1.

In FIG. 2, the laser output P of the semiconductor laser device 17 shows a linear function which rises from the threshold value Ith in response to the driving current I from the driving circuit 15.

During reproduction, only the reproduction mode signal Read is input to the OR circuit 11, and the switch 12 is closed. As a result, the high-frequency superposition module 14 is turned on, causing a high-frequency signal to be sent out from the high-frequency superposition module 14 via a capacitor C to the semiconductor laser device 17.

As shown in FIG. 2, a relatively low driving current I1 flows through the semiconductor laser device 17 and a high-frequency signal is superposed onto the driving current I1 during reproduction. Thus, the laser output from the semiconductor laser device 17 does not cause resonance by interference to occur due to high-frequency superposition even if return light from the optical disk enters. Therefore, the semiconductor laser device 17 emits constant-pulse light.

Comparatively, during recording, only the recording mode signal Write is input to the OR circuit 11, and the switch 12 is closed. As a result, the high-frequency superposition module 14 turns on, and a high-frequency signal is sent out from this high-frequency superposition module 14 via the capacitor C to the semiconductor laser device 17.

As shown in FIG. 2, during recording, a relatively high driving current I2 flows through the semiconductor laser device 17, and a high-frequency signal is superposed onto this driving current I2. Thus, the laser output from the semiconductor laser device 17 does not cause resonance by interference to occur due to high-frequency superposition even if return light from the optical disk enters, and therefore, a nearly constant laser output is produced by the pulsating electric current.

As a source for generating the above-mentioned high-frequency signal, a high-frequency superposing circuit for reproduction purposes is used. Thus, it is not necessary to newly provide a high-frequency superposing circuit, and the construction can be simplified.

In such a case, preferably, the driving current I2 and the amplitude of the high-frequency signal are selected so that the peak of the laser output by the pulsating electric current becomes a rated value or less.

Figure 3:
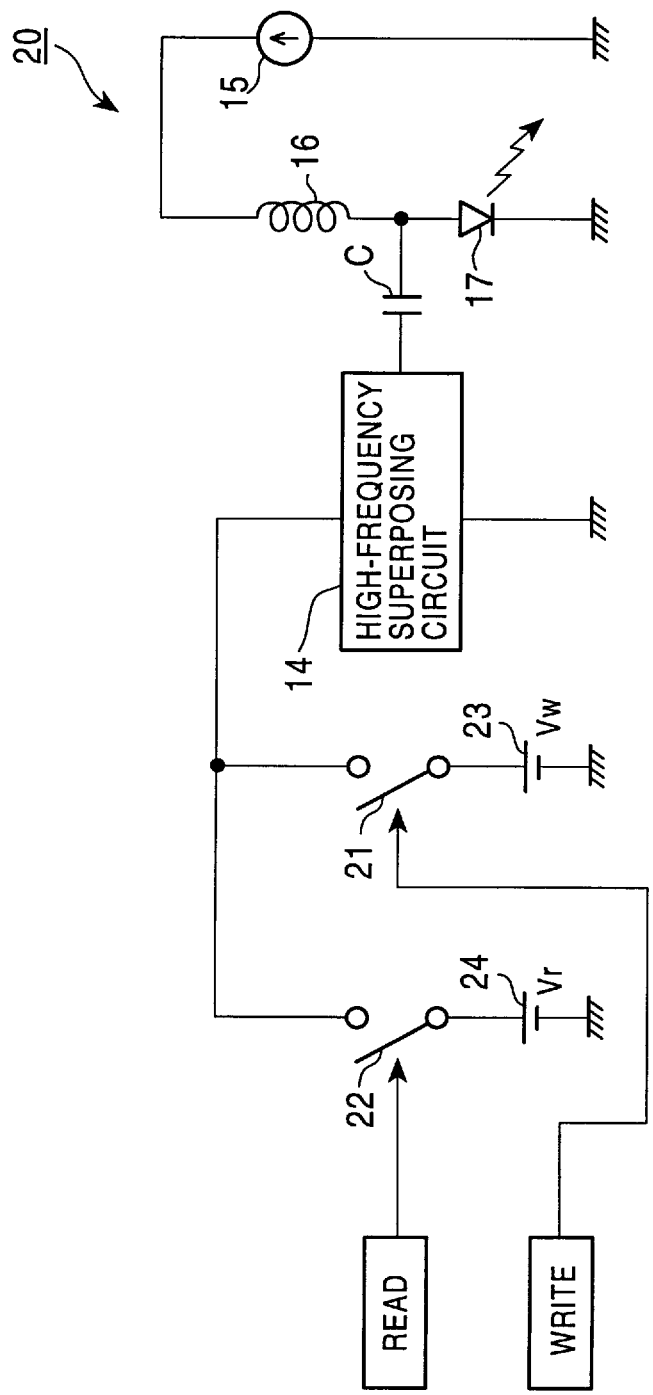
FIG. 3 is a block diagram illustrating a second embodiment of a laser output control apparatus according to the present invention.
Figure 4:
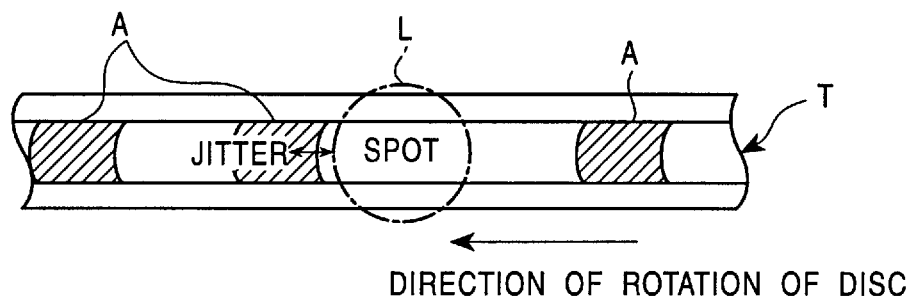
FIG. 4 is a schematic diagram illustrating a spot formed on a track of a magneto-optical disc and a magneto-optically recorded state in a conventional magneto-optical disc unit.
Figure 5:
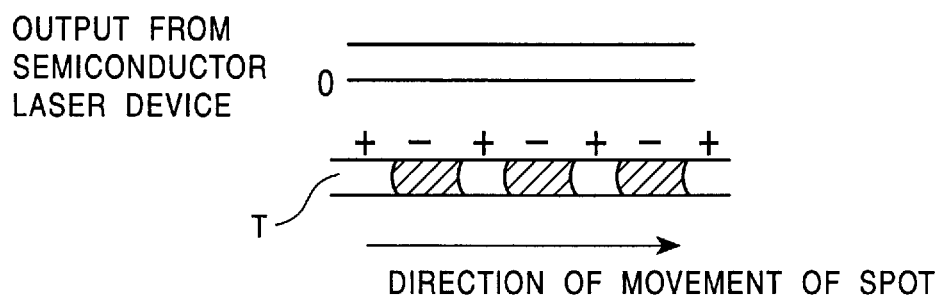
FIG. 5 is a schematic diagram illustrating a magneto-optical recording state when laser output is normal during recording in the magneto-optical disc unit of FIG. 4.
Figure 6:
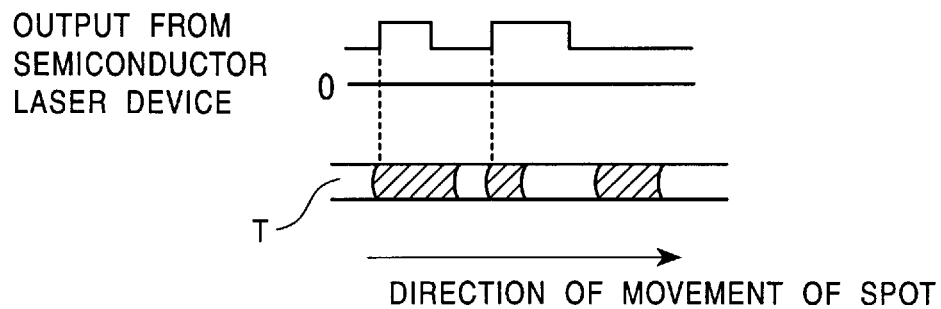
FIG. 6 is a schematic diagram illustrating a state in which laser output during recording is slightly low and writing jitter has occurred in the magneto-optical disc unit of FIG. 4.

FIG. 3 shows a second embodiment of a laser output control apparatus of a magneto-optical disc unit according to the present invention.

Referring to FIG. 3, a laser output control apparatus 20 comprises two switches 21 and 22 which are opened and closed in accordance with a recording mode signal Write and a reproduction mode signal Read from a control circuit of a magneto-optical disc unit (not shown), respectively; two power sources 23 and 24 which are connected in series with the switches 21 and 22; a high-frequency superposing circuit (a high-frequency module) 14 connected to the power sources 23 and 24 via the switches 21 and 22, respectively; and a semiconductor laser device 17 to which a high-frequency signal from the high-frequency superposition module 14 and a driving signal (driving electric current) from the driving circuit 15 via the choke coil 16 are applied.

The switches 21 and 22 are switches for turning on and off a voltage for driving the high-frequency superposition module 14 from the power sources 23 and 24, respectively. Each of the switches 21 and 22 is closed in accordance with the recording mode signal Write and the reproduction mode signal Read.

The power sources 23 and 24 are set at voltages Vw and Vr, respectively. Here, the voltage Vr is the same as the voltage of the power source 13 used in the above-described laser output control apparatus 10 in FIG. 1. Also, the voltage Vw is set at a voltage slightly lower than the voltage Vr.

Here, the voltage Vw of the power source 23 used during recording is appropriately set so that the peak of the laser output from the semiconductor laser device 17 by high-frequency superposition does not exceed the rated value of the laser output.

Further, the high-frequency superposition module 14 operates upon the application of the voltage Vw or Vr from the power source 23 or 24, respectively, when the switches 21 and 22 are individually closed, and outputs a high-frequency signal of a predetermined frequency, e.g., 100 MHz to 1 GHz, and preferably 600 MHz.

In such a case, the driving voltage differs depending upon Vw and Vr. As a result, the selection of the driving voltage Vw during recording causes the high-frequency superposition module 14 to output a high-frequency wave in which the output amplitude is decreased.

The driving circuit 15, the choke coil 16 and the semiconductor laser device 17 are the same as those components of the laser output control apparatus 10 in FIG. 1, and operate in the same way.

According to the laser output control apparatus 20 constructed as described above, during reproduction, the reproduction mode signal Read is input to the switch 22, causing the switch 22 to be closed. As a result, the driving voltage Vr from the power source 24 is applied to the high-frequency superposition module 14, and a high-frequency signal is sent out from the high-frequency superposition module 14 via the capacitor C to the semiconductor laser device 17.

Therefore, as shown in FIG. 2, a relatively low driving current I1 flows through the semiconductor laser device 17 during reproduction, and a high-frequency signal is superposed onto the driving current I1. Thus, the laser output from the semiconductor laser device 17 does not cause resonance due to interference to occur as a result of high-frequency superposition even if return light from the optical disk enters, and therefore, the semiconductor laser device 17 emits constant-pulse light.

Comparatively, during recording, a recording mode signal Write is input to the switch 21, causing the switch 21 to be closed. As a result, the driving voltage Vw is applied to the high-frequency superposition module 14 from the power source 23, and a high-frequency signal is sent out from the high-frequency superposition module 14 via the capacitor C to the semiconductor laser device 17.

In such a case, since the high-frequency superposition module 14 operates in accordance with the driving voltage Vw lower than that during reproduction, the high-frequency signal output from the high-frequency superposition module 14 is smaller in amplitude than that during reproduction. Therefore, the output amplitude of the laser output of the semiconductor laser device 17 is also decreased. Thus, as shown in FIG. 2, a relatively high driving current I2 flows through the semiconductor laser device 17 during recording, and a high-frequency signal is superposed onto the driving current I2. Thus, the laser output from the semiconductor laser device 17 does not cause resonance by interference to occur due to the high-frequency superposition even if return light from the optical disk enters, and therefore, a nearly constant laser output is produced by the pulsating electric current.

As has been described up to this point, according to the present invention, since a high-frequency signal is superposed onto a driving signal of a semiconductor laser device during recording, a constant laser output can be obtained even if the laser output from the semiconductor laser device is relatively low during recording. Thus, signals are recorded accurately on predetermined tracks on the surface of a signal recording surface of a magneto-optical disc.

Therefore, according to the present invention, recording can be performed normally during recording even if the output of a semiconductor laser device used as a light source during recording on or reproduction from a magneto-optical disc is not constant from device to device.

What is claimed is:

1. A recording and reproducing apparatus of a magneto-optical recording medium, comprising:

a semiconductor laser device for irradiating a light beam to a magneto-optical recording medium;

a driving circuit for supplying a driving signal to said semiconductor laser device; and a single oscillation means for generating a high-frequency signal to be superposed onto a driving signal from said driving circuit, wherein a signal such that a high-frequency signal from said oscillation means is superposed onto a driving signal from said driving circuit is supplied to said semiconductor laser device during recording and reproduction, a vertical magnetic field modulated on the basis of recording data is applied to said magneto-optical recording medium during recording and data is recorded on said magneto-optical recording medium by irradiating a light beam, and a light beam is irradiated onto said magneto-optical recording medium during reproduction and data recorded on said magneto-optical recording medium is read on the basis of return light from said magneto-optical recording medium.

2. A recording and reproducing apparatus according to claim 1, wherein a high-frequency signal generated from said oscillation circuit has a frequency of 100 MHz to 1 GHz.

3. A recording and reproducing apparatus according to claim 1, wherein the high-frequency signal generated from said oscillation circuit has a frequency of 600 MHz.

4. A recording and reproducing apparatus according to claim 1, wherein said driving circuit drives and controls a semiconductor laser device in order that the laser output of said semiconductor laser device is greater during recording than that during reproduction.

5. A recording and reproducing apparatus according to claim 1, wherein said driving circuit drives and controls a semiconductor laser device in order that the output amplitude of the high-frequency signal oscillated from said oscillation means is smaller during recording than during reproduction.

6. A recording and reproducing apparatus of a magneto-optical recording medium, comprising:

a semiconductor laser device for irradiating a light beam to a magneto-optical recording medium;

a driving circuit for supplying a driving signal to said semiconductor laser device;

a single oscillation means for generating a high-frequency signal to be superposed onto a driving signal from said driving circuit;

a first power-supply circuit for applying a first driving voltage to said oscillation means during recording on a magneto-optical recording medium; and a second power-supply circuit for applying a second driving voltage to said oscillation means during reproduction from a magneto-optical recording medium, wherein a signal such that a high-frequency signal from said oscillation means is superposed onto a driving signal from said driving circuit is supplied to said semiconductor laser device during recording and reproduction, a vertical magnetic field modulated on the basis of recording data is applied to said magneto-optical recording medium during recording and data is recorded on said magneto-optical recording medium by irradiating a light beam, and a light beam is irradiated to said magneto-optical recording medium during reproduction and data recorded on said magneto-optical recording medium is read on the basis of return light from said magneto-optical recording medium.

7. A recording and reproducing apparatus according to claim 6, wherein the driving voltage from said first power-supply circuit is set to be lower than the driving voltage from said second power-supply circuit.

8. A recording and reproducing apparatus according to claim 6, wherein a high-frequency signal generated from said oscillation circuit has a frequency of 100 MHz to 1 GHz.

9. A recording and reproducing apparatus according to claim 6, wherein the high-frequency signal generated from said oscillation circuit has a frequency of 600 MHz.

10. A recording and reproducing apparatus according to claims 6, wherein said driving circuit drives and controls a semiconductor laser device in order that the laser output of said semiconductor laser device is greater during recording than that during reproduction.

\* \* \* \* \*